May 6, 1930.  H. HOLZWARTH  1,757,574
EXPLOSION TURBINE
Filed Oct. 2, 1926
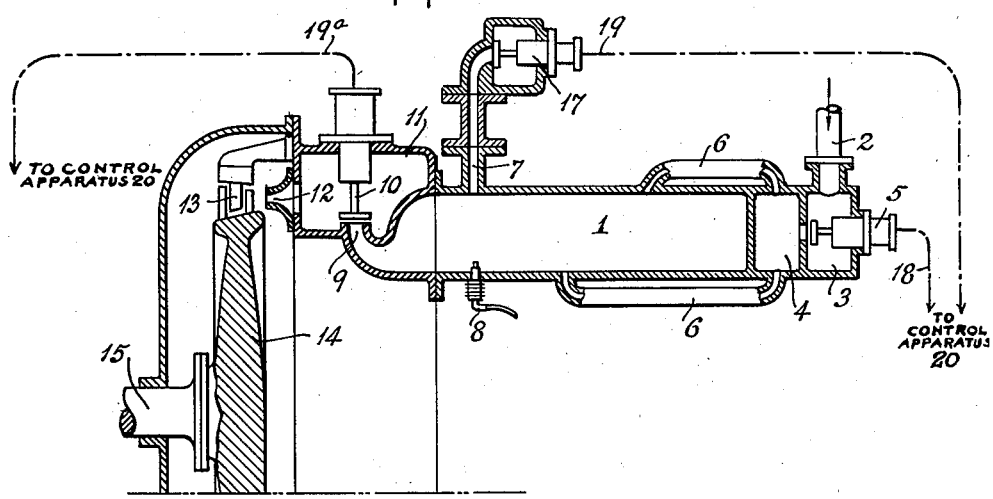
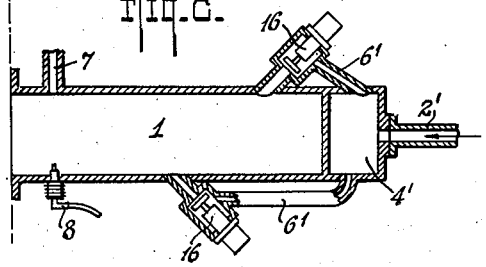
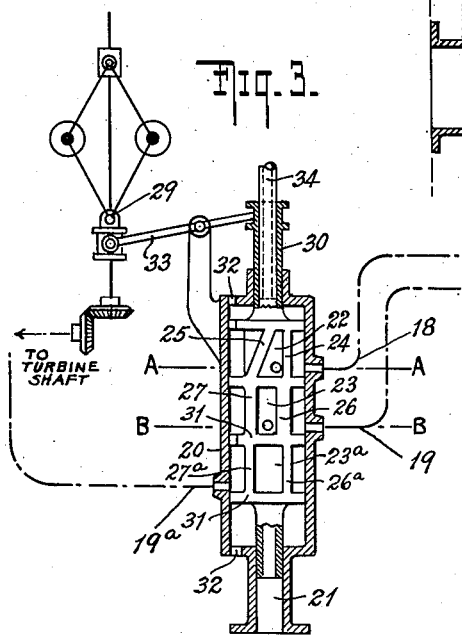
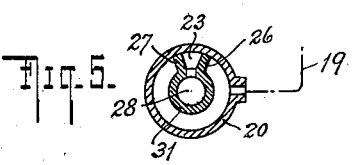
WITNESS
G. V. Rasmussen
INVENTOR
HANS HOLZWARTH
BY
ATTORNEYS Patented May 6, 1930

1,757,574

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

EXPLOSION TURBINE

Application filed October 2, 1926. Serial No. 139,174.

My invention relates to combustion engines and particularly to those of the turbine type. The object of the present invention is to provide improved means for regulating the operation of the engine by certain novel arrangements in the supply of fuel to the combustion engine or explosion chamber. The invention utilizes a combustion chamber having separate inlets for the fuel at different points of the chamber, one of said inlets being in the vicinity of the spark plug or other ignition device and between the remaining inlets and the outlet of the combustion chamber. According to my present invention, the fuel admitted through the inlet which is in the neighborhood of the ignition device, is supplied under a constant pressure or at a constant rate, while the fuel admitted through the other inlet or inlets is supplied in an amount regulated automatically by the engine itself in accordance with the load thereon. In this manner I preserve a substantially uniform composition and a relatively rich fuel and air mixture in the neighborhood of the ignition device, so that ignition will take place readily under the varying conditions of load, while the number of thermic units contained in the mixture, and therefore the energy developed by the combustion thereof, will be varied according to the load on the engine.

Two satisfactory examples of an engine embodying my present invention are illustrated by the acompanying drawings, in which Fig. 1 is a sectional view through an explosion chamber of an explosion turbine constructed in accordance with my invention; Fig. 2 is a similar view of a modification; Fig. 3 is a sectional view of the hydraulic apparatus controlling the inlet and outlet valves, and Figs. 4 and 5 are sections along lines A—A and B—B, respectively, of Fig. 3.

In Fig. 1, the explosion chamber or combustion chamber 1 is of the character found in combustion turbines of the Holzwarth type. While only one such chamber has been shown in the drawing, it will be understood that the complete engine comprises a plurality of such chambers and that the parts shown and described with reference to one chamber are applied to each of such combustion chambers.

Said chamber is provided with a main inlet 2 for the admission of the fuel, which may be gas, gasoline or other suitable medium, leading to a compartment 3 the connection of which with a distributing chamber 4 is controlled by a valve 5 suitably operated by the moving parts of the engine as hereinafter described so as to open said valve more or less according to the load on the engine. From the distributing chamber 4, conduits 6 lead to the combustion chamber 1 preferably at different points of its length as indicated. In addition thereto, the combustion chamber 1 is provided with an auxiliary fuel inlet 7 arranged to discharge fuel in the vicinity of the spark plug or other ignition device 8. Through this auxiliary inlet 7, fuel is supplied at a constant rate or under constant pressure, thereby ensuring a mixture of substantially uniform richness in the neighborhood of the ignition device and thus assuring that the explosion or combustion will take place easily irrespective of the variations in the richness of the main body of the mixture brought about by the alteration in the position of the valve 5. From the combustion chamber 1 the hot gases pass out through an outlet 9 controlled by a valve 10 which is operated at the proper time by suitable mechanism to be hereinafter described in detail in connection with the control of the inlet valves; and connected with the moving parts of the engine. When such outlet valve is open, the gases pass into a nozzle chamber 11 having nozzles 12 which discharge the hot gases under high pressure against the blades 13 of a turbine rotor 14 mounted on the shaft 15. While I have not indicated any of the parts for the introduction of the air to support combustion in the chamber 1 or for scavenging after the explosion, it will be understood that any well-known or approved arrangement may be adopted for this purpose.

One feature of the present invention is the fact that the fuel admitted through the auxiliary inlet 7 is supplied at a constant rate or under a constant pressure, while the amount of fuel supplied through the inlet 2, and particularly through the conduits 6, varies according to variations of the load, being controlled by the valve 5. Another feature of the invention is the location of the ignition device and the auxiliary inlet 7 through which such constant supply of fuel is fed to the vicinity of the ignition device, between the main fuel supply ports and the outlet of the combustion chamber.

In Fig. 2 I have illustrated a slightly different construction in which the main fuel inlet 2' leads directly without any valve arrangement, into a distributing chamber 4' and in which the conduits 6' are provided with individual valves 16 controlled in the same manner as the valve 5 of Fig. 1. The auxiliary fuel inlet 7, however, is of the same character as in Fig. 1 and supplies the fuel at a constant rate or under constant pressure, with the same advantages as explained above.

The various fuel inlets, as well as the outlet 9, and their respective valve mechanisms are preferably controlled hydraulically. For this purpose, the valve 5 is connected by means of conduit 18 and the valve 17, controlling the fuel inlet 7, by conduit 19 to a hydraulic controlling apparatus separately shown in Fig. 3.

The controlling apparatus consists of a hollow cylindrical housing 20 in which operates a hollow rotary slide valve 31 driven by a shaft 30. The interior of the hollow slide valve is connected by conduit 21 to an oil pressure accumulator so that it is constantly under a uniform oil pressure.

The rotary valve includes a cylindrical body of smaller diameter than the internal diameter of the housing. The space between the rotatable body and the housing is divided into vertically spaced chambers 22, 23, 23ª by horizontal disc-like projections and by the vertical fins 24, 25, 26, 27, 26ª and 27ª, each of such chambers being in communication with the interior of the rotating body, as shown in Figs. 4 and 5. The intermediate space outside of these chambers is connected to an oil drain through the openings 32. During the revolution of the cylinder these chambers periodically come into alignment with openings in the housing which are connected with the conduits 18, 19, 19ª. So often and so long as these conduits 18, 19 and 19ª are connected in this way with the interior of the rotary slide valve they receive oil under pressure from the oil accumulator and in consequence the corresponding valves 5, 17, and 10, to which such conduits lead, are opened. After the chambers 22, 23 and 23ª have passed by the openings and are again connected with the oil drain the valves are drawn back upon the seats by means of a spring or other means. While the chambers 23 and 23ª which act upon conduits 19 and 19ª and thereby open the valves 17 and 10 are rectangular, the chamber 22 which is connected through conduit 18 with valve 5 has inclined edges. In this way the open period of the valve 5 is controlled by the load of the machine. The rotating slide valve is connected with the governor 29 by means of a lever 33 engaging an annular groove in the casing 30. Upon increase in speed of the machine beyond the normal, the governor presses the slide valve down by means of the casing 30. In this way, the opening of the conduit 18 is connected with the narrower part of the chamber 22 whereby the open period of the valve is correspondingly reduced and the feed of the combustible material through valve 5 decreased.

The shaft 34 of the hydraulic controlling apparatus is driven preferably in such a manner that the speed of its rotation is maintained as uniform as possible, for example in the manner shown in my earlier United States Patent No. 877,194, by means of an electric motor whose number of revolutions is reduced by means of a worm gear.

It will be understood that any suitable form of valve 5 and controlling mechanism operative to govern the opening of such valve in response to the speed of the turbine may be employed and the valve controlling mechanism shown in Fig. 3 shows merely by way of example a suitable type of valve controller; this mechanism, however, forms no part of the present invention and no claim is made thereto.

Calculations have shown that the efficiency of the machine is altered but slightly when the character of the fuel, as to the number of heat units contained therein, is altered within relatively wide limits, say from 500 thermal units down to 300. Therefore the mode of regulation described herein has the special advantage of not affecting materially the efficiency of the turbine or machine as a whole. In this new system of regulation therefore, all of the combustion chambers may be kept in operation all the time, whereas in the practice employed hitherto, resort was often had to the expedient of temporarily throwing some of the combustion chambers out of action when the machine was operating under a reduced load.

Various changes in the specific forms shown and described may be made within the scope of the claims without departing from the spirit of my invention.

I claim:

1. In a combustion gas turbine, an explosion chamber adapted to receive charges of air and fuel for explosion therein and provided with an ignition device and with a plurality of intermittently operable fuel inlets, one of which is located in the neighborhood of said ignition device, and regulating means, controlled by the operation of the turbine, for varying the supply of fuel to the other inlets, while the supply of fuel through the inlet in the neighborhood of the ignition device is constant, the ignition device and its associated source of constant fuel supply being located between said other fuel inlets and the outlet of the explosion chamber.

2. In a combustion gas turbine, an explosion chamber adapted to receive charges of air and fuel for explosion therein and provided with an ignition device and with a plurality of intermittently operable fuel inlets one of which is located in the neighborhood of said ignition device, and a valve, controlled by the operation of the turbine, for varying the supply of fuel to the remaining inlet or inlets, while the supply of fuel through the inlet in the neighborhood of the ignition device is constant, the ignition device and its associated source of constant fuel supply being located between said other fuel inlets and the outlet of the explosion chamber.

In testimony whereof I have hereunto set my hand.

HANS HOLZWARTH.